US008085211B2

(12) United States Patent
Yang et al.

(10) Patent No.: US 8,085,211 B2
(45) Date of Patent: Dec. 27, 2011

(54) SINGLE DRIVE VARIABLE AZIMUTH AND BEAM TILT ANTENNA FOR WIRELESS NETWORK

(75) Inventors: Ching-Shun Yang, Irvine, CA (US); Kommana Tejomurthi, Hyderabad (IN); Alexander Rabinovich, Cypress, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 358 days.

(21) Appl. No.: 12/323,401

(22) Filed: Nov. 25, 2008

(65) Prior Publication Data

US 2009/0135074 A1 May 28, 2009

Related U.S. Application Data (60) Provisional application No. 61/004,242, filed on Nov. 26, 2007.

(51) Int. Cl.
*H01Q 13/10* (2006.01)
*H01Q 3/10* (2006.01)

(52) U.S. Cl. ........ 343/766; 343/765; 343/758; 343/761; 343/893

(58) Field of Classification Search .................. 343/757, 343/766, 872, 893, 894
See application file for complete search history.

(56) References Cited

U.S. PATENT DOCUMENTS

| 5,223,845 | A   | * | 6/1993  | Eguchi ............................ 342/359  |
| 5,517,205 | A   |   | 5/1996  | Van Heyningen et al.                         |
| 5,949,303 | A   |   | 9/1999  | Arvidsson et al.                             |
| 6,668,996 | B2  |   | 12/2003 | Nekado et al.                                |
| 6,738,024 | B2  | * | 5/2004  | Butler et al. ................... 343/766    |
| 7,391,381 | B2  | * | 6/2008  | Wang et al. .................... 343/713     |
| 7,427,962 | B2  |   | 9/2008  | Yang                                         |
| 7,505,010 | B2  | * | 3/2009  | Franzon et al. ................ 343/757      |
| 7,893,885 | B2  | * | 2/2011  | Jung et al. ..................... 343/765    |
| 2004/0041740 | A1 |   | 3/2004  | Karlsson et al. ............. 343/853        |
| 2005/0105552 | A1 | * | 5/2005  | Osterling ....................... 370/466    |
| 2007/0241979 | A1 | * | 10/2007 | Yang ............................. 343/765   |
| 2009/0015498 | A1 | * | 1/2009  | Deng et al. .................... 343/757     |
| 2009/0195467 | A1 | * | 8/2009  | Vassilakis et al. ............ 343/765       |

FOREIGN PATENT DOCUMENTS

| WO | 96/37922 | 11/1996 |
| WO | 02/35651 | 5/2002  |

OTHER PUBLICATIONS

International Search Report and Written Opinion pertaining to Application No. PCT/US08/084760 mailed Jan. 29, 2009.

* cited by examiner

*Primary Examiner* — Trinh Dinh
(74) *Attorney, Agent, or Firm* — OC Patent Law Group (57) ABSTRACT

An antenna array employing a combined azimuth and elevation beam angle adjustment electromechanical system is disclosed. The system employs a dual purpose remotely controllable actuator. The actuator is used to adjust azimuth angle of the antenna array and radiation beam tilt of the same. An antenna array employing a combined azimuth, beamwidth and elevation beam angle adjustment electromechanical system is also disclosed.

20 Claims, 5 Drawing Sheets

SINGLE DRIVE VARIABLE AZIMUTH AND BEAM TILT ANTENNA FOR WIRELESS NETWORK

RELATED APPLICATION INFORMATION

The present application claims priority under 35 USC section 119(e) to U.S. Provisional Patent Application Ser. No. 61/004,242, filed Nov. 26, 2007, the disclosure of which is herein incorporated by reference in its entirety.

BACKGROUND OF THE INVENTION

1. Field of the Invention

The present invention relates in general to communication systems and components. More particularly the present invention is directed to antennas and antenna arrays employed in wireless communications systems.

2. Description of the Prior Art and Related Background Information

Modern wireless antenna implementations generally include a plurality of radiating elements that may be arranged over a ground plane defining a radiated (and received) signal beamwidth and azimuth angle relative to a defined bore sight. The azimuth radiation pattern of the antenna (in horizontal plane) can be advantageously moved to provide different geographic coverage by rotating the antenna assembly about a vertical axis. In the past such movement has been achieved by implementing electro mechanical rotors and the like. In addition to azimuth radiation shifting, modern wireless antennas may employ remote electrical tilt (RET) to control antenna beam tilt which allows real time augmentation of cell coverage due to topography and traffic density. RET allows wireless network operators to alter vertical radiation pattern, i.e. the pattern's cross-section in the vertical plane, as there is a need to alter the vertical angle of the antenna's main beam (also known as the "tilt"), in order to adjust the coverage area of the antenna. RET can be readily achieved by providing accurate phase control over signals fed to different antenna elements.

An example of RET implementation can be found in R. C. Johnson, Antenna Engineers Handbook, 3rd Ed 1993, McGraw Hill, ISBN 0-07-032381-X, Ch 20, FIG. 20-2 discloses a method for locally (or possibly remotely) adjusting the angle of electrical tilt of a phased array antenna. In this method, a radio frequency (RF) transmitter carrier signal is fed to through a power distribution network before being coupled to individually controllable phase shifters. Each antenna element is coupled to its associated phase shifter. RET is achieved when signal phase is adjusted as a function of antenna aperture (reflector length).

This prior art method antenna has a number of disadvantages due to high cost involved in implementing individual phase shifters. These circuit costs may be offset by using a single common phase shifter for a group of antenna elements instead of per antenna element are previously known from the documents WO96/37922, corresponding to U.S. Pat. No. 5,949,303, and WO002/35651 A1 assigned to current assignee and incorporated wholly herein by reference.

Real world applications often call for an antenna array having remotely controllable "azimuth" antenna gain pattern (the pattern in the horizontal plane) and the "elevation" pattern (the pattern in the vertical plane)—RET, as well as having a variable Half Power Band Width (HPBW) adjustment capability. Such highly functional antenna arrays are typically retrofitted in place of simpler, lighter and less functional antenna arrays while weight and wind loading of the newly installed antenna array can not be significantly increased. Generally, to provide above mentioned functionality remote actuators utilize electromechanical control systems which may add substantial weight, size and complexity to an antenna assembly. Consequently, there is a need to provide a simpler remote means to adjust antenna "azimuth" pattern and the "elevation" pattern—RET.

SUMMARY OF THE INVENTION

In a first aspect the present invention provides a mechanically variable azimuth and beam tilt antenna, comprising a reflector, a plurality of radiators coupled to the reflector, a first mechanical drive element coupled to the reflector, a mechanically controlled phase shifter, a second mechanical drive element coupled to the phase shifter, and a single actuator selectively coupled to the first and second mechanical drive elements. Signal azimuth direction is variable based on positioning of the reflector by the actuator in a first control mode and elevation beam tilt is controlled by adjusting the phase adjuster by the actuator in a second control mode.

In a preferred embodiment of the antenna, the actuator is coupled to the first and second mechanical drive elements by a transfer module and the transfer module receives a control signal to selectively couple the actuator to the first and second mechanical drive elements. The actuator preferably comprises a motor and the first and second mechanical drive elements preferably comprise first and second rotatable shafts. The second rotatable shaft is preferably coupled to the phase shifter by a linear actuator and a coupling for creating linear motion from rotation of the second shaft. The antenna preferably further comprises a fixed azimuth ring gear extending through an azimuth arcuate range and the first rotatable shaft is coupled to the azimuth ring gear by an azimuth cog gear. The antenna preferably further comprises an azimuth position indicator coupled to the first rotatable shaft. The antenna preferably further comprises a motor control module and a feedback coupling from the azimuth position indicator to the motor control module. The antenna preferably further comprises a phase shifter position indicator coupled to the linear actuator and a feedback coupling from the phase shifter position indicator to the motor control module. The antenna preferably further comprises a radome and the reflector is configured inside the radome and rotates within the radome.

In another aspect the present invention provides a mechanically variable azimuth, beamwidth and beam tilt antenna. The antenna comprises an antenna array including a reflector and a plurality of radiators coupled to the reflector, a first mechanical drive element coupled to the reflector, a mechanically controlled phase shifter, a second mechanical drive element coupled to the phase shifter, a third mechanical drive element coupled to the antenna array, and a single actuator selectively coupled to the first, second and third mechanical drive elements. Signal azimuth direction is variable based on positioning of the reflector by the actuator in a first control mode, elevation beam tilt is controlled by adjusting the phase adjuster by the actuator in a second control mode and beamwidth is controlled by adjusting relative radiator positioning in a third control mode.

In a preferred embodiment of the antenna, the radiators are movable relative to the reflector in response to the second actuator motion to alter beamwidth. The single actuator preferably comprises a motor and the first, second and third mechanical drive elements preferably comprise rotatable shafts. The antenna preferably further comprises a transfer module selectively coupling the motor and the rotatable shafts.

In another aspect the present invention provides an antenna electromechanical system, comprising a motor control module including a single motor and a motor control processor, a selective transfer coupling mechanism coupled to the motor, a first rotatable drive element coupled to the motor via the selective transfer coupling mechanism and to an antenna reflector coupling, and a second rotatable drive element coupled to the motor via the selective transfer coupling mechanism and to a mechanical phase shifter coupling. The selective coupling mechanism receives a control signal from the motor control processor to control selective coupling of the motor to the first and second rotatable drive elements.

In a preferred embodiment of the antenna electromechanical system the first and second rotatable drive elements each comprise a rotatable shaft. The antenna electromechanical system preferably further comprises first and second position detectors for sensing position of the first and second rotatable drive elements, respectively, and providing detected position signals to the motor control processor. The motor control processor preferably has an input for receiving remotely provided antenna azimuth and antenna beam tilt adjustment control signals.

In another aspect the present invention provides a method of adjusting signal azimuth direction and beam tilt in a wireless antenna having a reflector, a plurality of radiators coupled to the reflector, and a mechanically adjustable phase shifter. The method comprises receiving a remotely provided antenna azimuth adjustment control signal, operatively coupling a motor to a first drive element coupled to the reflector, and adjusting the reflector azimuth pointing direction using the first drive element driven by the motor to move the reflector. The method further comprises receiving a remotely provided antenna beam tilt adjustment control signal, decoupling the motor from the first drive element and operatively coupling the motor to a second drive element coupled to the phase shifter, and adjusting the beam tilt using the second drive element driven by the motor to move the phase shifter.

The method may further comprise receiving a remotely provided antenna beamwidth adjustment control signal, operatively coupling the motor to a third drive element coupled to the radiators, and adjusting signal beamwidth using the third drive element driven by the motor to move the radiators.

Further features and advantages of the present invention will be appreciated from the following detailed description of the invention.

DETAILED DESCRIPTION OF THE INVENTION

It is an object of the present invention to provide a combined remotely controllable azimuth (and/or HPBW adjustment) and elevation beam angle adjustment. In carrying out these and other objectives, features, and advantages of the present invention, an azimuth (and/or HPBW adjustment) and elevation beam angle antenna array is provided for a wireless network system. Reference will be made to the accompanying drawings, which assist in illustrating the various pertinent features of the present invention.

Figure 1:
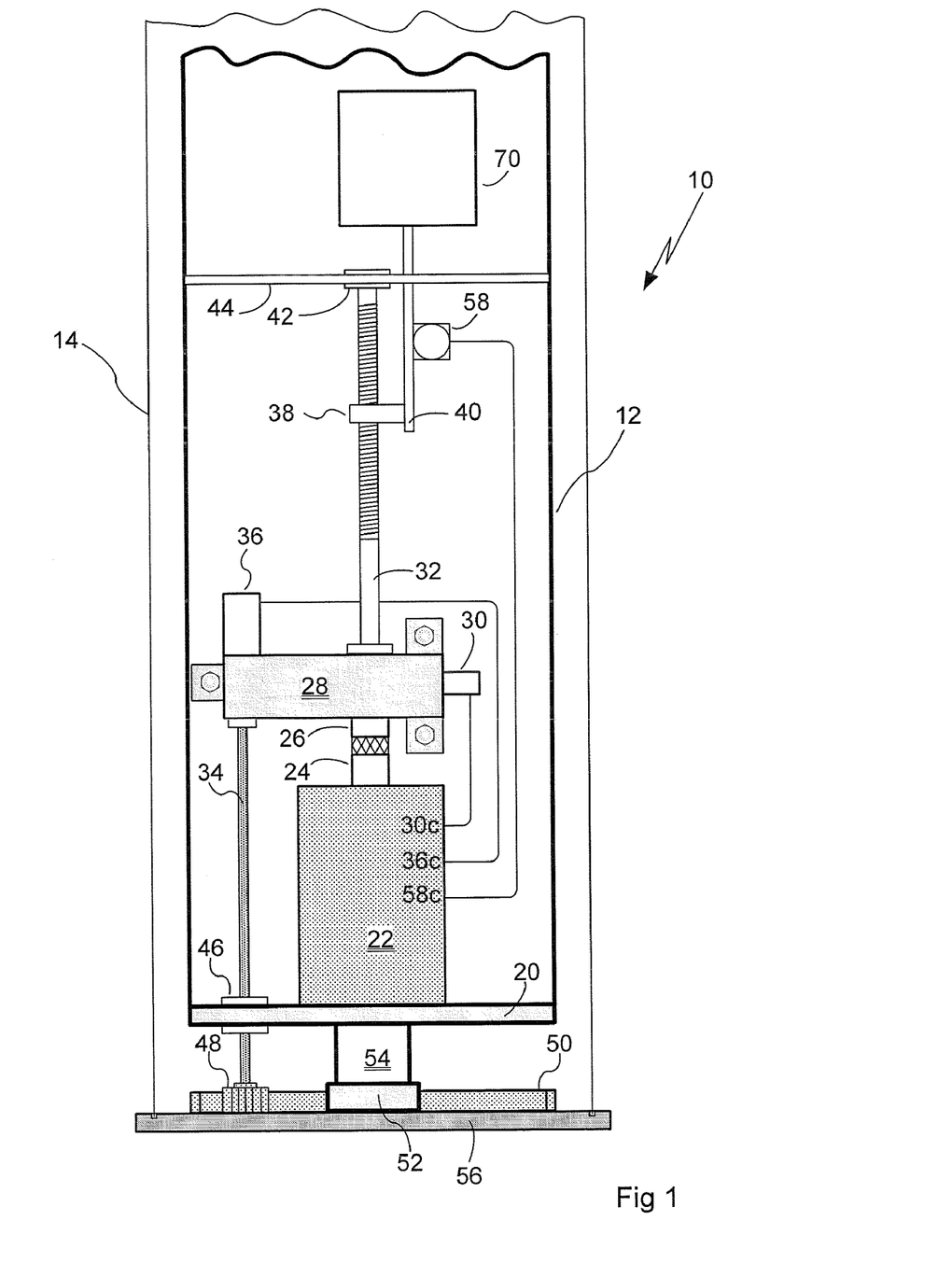
FIG. 1 is a block diagram for an antenna array employing a combined azimuth and elevation beam angle adjustment electromechanical system, in accordance with a preferred embodiment of the present invention, as viewed from the back of the antenna (back side partial view).
Figure 5:
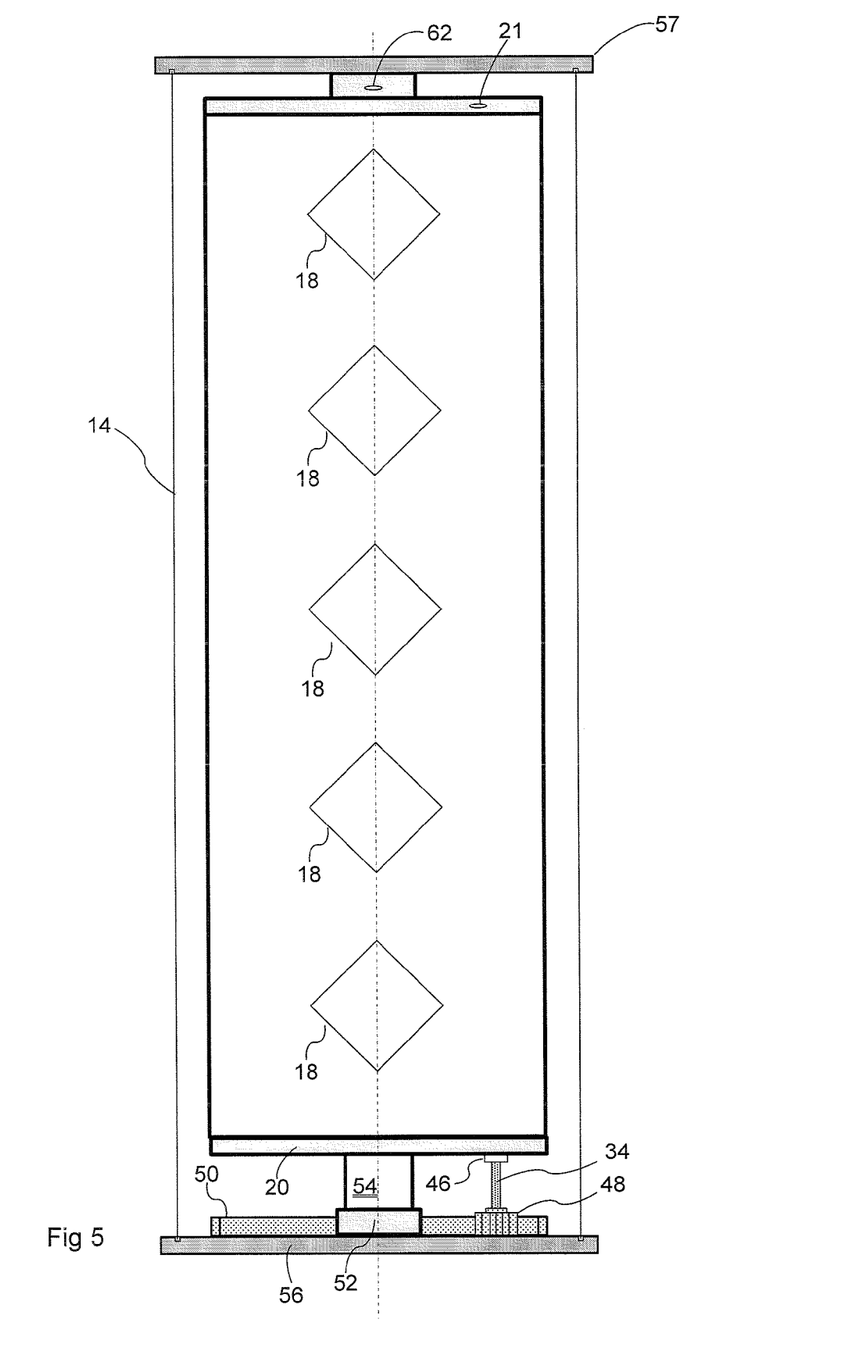
FIG. 5 is a front view of an antenna system in accordance with the first and second preferred embodiments of the present invention.

FIG. 1 shows a front view of antenna electromechanical actuator system, 10, according to an exemplary implementation, which is enclosed within a conventionally constructed radome 14. In a first preferred embodiment electromechanical actuator system, 10, is positioned at the bottom of the antenna array 12 for ease of field servicing if such need may arise. To avoid potential interference to antenna radiation pattern the electromechanical actuator system, 10 is positioned on the back side of the antenna reflector 16. FIG. 1 shows the non radiating (back side) side of antenna in a vertical orientation (Z-dimension) in a conventional installation configuration and FIG. 5 shows the front side. The reflector, 16, may, for example, consist of an electrically conductive plate (or extruded material) suitable for use with Radio Frequency (RF) signals. Furthermore, reflector 16, plane is shown in a 'gull' wing configuration, but in actual practice additional features (not shown) or alternative configurations may be added to aid reflector performance.

As shown in FIG. 5, the antenna array, 12, contains a plurality of RF radiators 18 arranged vertically and preferably proximate to the vertical center axis of the reflector 16, plane and are vertically offset from one another. In the illustrative non-limiting implementation shown, reflector 16 plane, together with a plurality of dipole elements 18 form an antenna array useful for RF signal transmission and reception. However, it shall be understood that alternative radiating elements, such as taper slot antenna, horn, folded dipole, etc., can be used as well. Alternative radiating element 18 placements can be also used, including multi column arrangements.

Antenna array 12 is supported with a simple pivot arrangement utilizing a bottom support pivot 52 and top pivot 62. Alternative pivoting structures are possible. A form shaped bracket 54 is used to attach antenna array 12 at the bottom and a similar bracket (not shown) provides top support. Bottom support pivot 52 is positioned on a stationary bottom plate 56 which is attached to the fixed backbone brace 60 used for antenna array mounting to a suitable support structure, for example a tower or a side of building.

Attached to the bottom of the antenna reflector 16 plane is a bottom end cap 20 used as bulkhead for RF and control cables (not shown) as well as providing overall structural rigidity. Complimentary top end cap (not shown) provides overall rigidity to the antenna reflector 16 by reducing longitudal twisting.

Figure 2A:
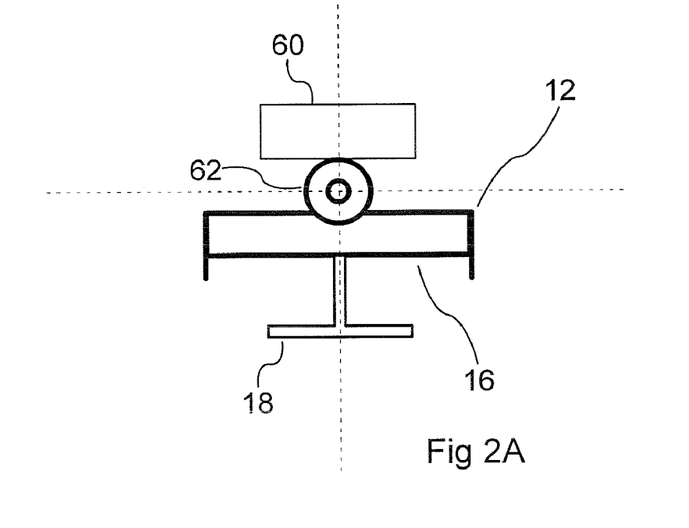
FIG. 2A is a top view of a partially assembled antenna array in accordance with a preferred embodiment of the present invention.
Figure 2B:
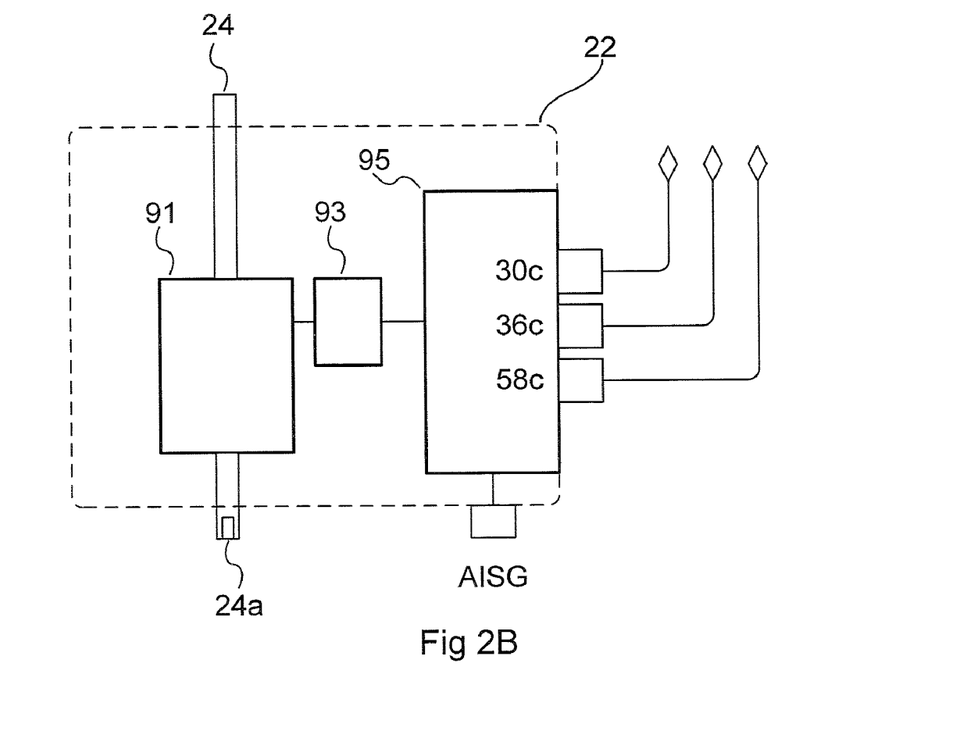
FIG. 2B is a block diagram of the Motor Control Module (MCM) in accordance with a preferred embodiment of the present invention.
Figure 3A:
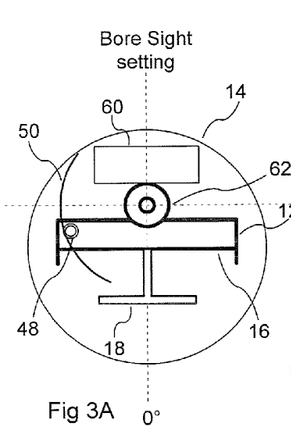
FIGS. 3A, 3B and 3C are top view schematic drawings showing azimuth rotation of the antenna array.
Figure 3B:
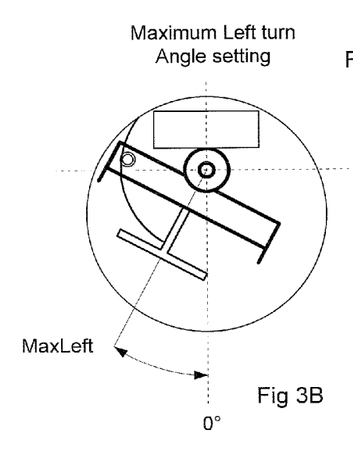
Figure 3C:
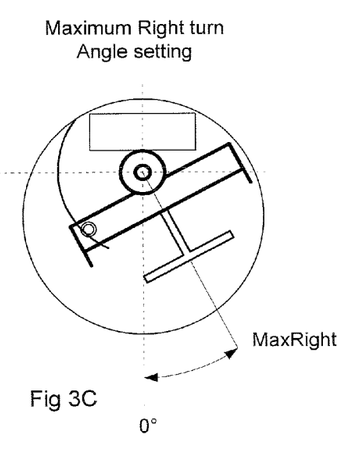

Placed just above bottom end cap 20 is a Motor Control Module (MCM) 22. Details pertaining to MCM are shown in FIG. 2B and will be described later. MCM 22 houses an electrical motor and control circuitry which is remotely controllable via a suitable interface, such as Antenna Interface Standards Group (AISG).

MCM motor output shaft 24 is coupled to a transfer case 28 input drive shaft. It is highly desirable to construct MCM 22 module to be field serviceable—so as to provide minimum disassembly required to replace a failed module without removing the antenna from service. Accordingly, well known quick disconnect electrical and mechanical connectors are preferably used to couple MCM motor output shaft 24 to transfer case 28 input drive shaft.

Transfer case 28 is used to redirect MCM 22 motor output to selectively provide dimensional displacement where needed. In an exemplary non limiting embodiment, transfer case 28, under one control mode, may be configured to drive a jack screw 32 used to control RET phase shifter 70 (details are provided in the above noted WO96/37922 and WO02/35651 published applications and '303 patent incorporated by reference herein; additional mechanical phase shifter implementations are known to those skilled in the art). If so required, actuating solenoid 30 under MCM control 30c operating in another control mode, is used to redirect MCM 22 motor output to provide rotational drive to azimuth rotator shaft 34. Since MCM motor output may have limited torque capabilities on its own gear reduction can be used within transfer case 28 to provide torque multiplication and speed reduction. In addition to torque multiplication and speed reduction transfer case 28 may incorporate lockouts or parking brakes to prevent unintended output shaft displacement when disconnected from MCM 22 drive shaft.

In a dynamically re-configurable antenna system it is important to know current displacement vs. commanded displacement. Consider a RET adjustment, wherein transfer case 28 is configured to direct MCM motor 91 output 24 shaft rotation to RET jack shaft 32 which is coupled via coupling nut 38 to a displacement rod 40. Rotation of the jack shaft 32 is converted into linear displacement useful for adjusting phase shifter 70. Coupled to a displacement rod 40 is displacement detector 58 which provides feedback 58c back to MCM 22. For azimuth positional feedback, rotational indicator 36 is used to provide azimuth 34 shaft rotation feedback 36c to MCM 22. Alternative displacement indicators, their positioning within antenna assembly and alternative feedback techniques can be used to provide displacement feedback means to MCM 22. For azimuth angle adjustments azimuth 34 shaft is passed through a support bearing 46 to a cog gear 48 coupled to a stationary ring gear 50, which is attached to a bottom plate 56. Since bottom plate 56 is fixed and the antenna array is rotatable about pivot axis 52 controlled rotation of the azimuth 34 shaft provides azimuth angle adjustment of the antenna array.

Figure 4:
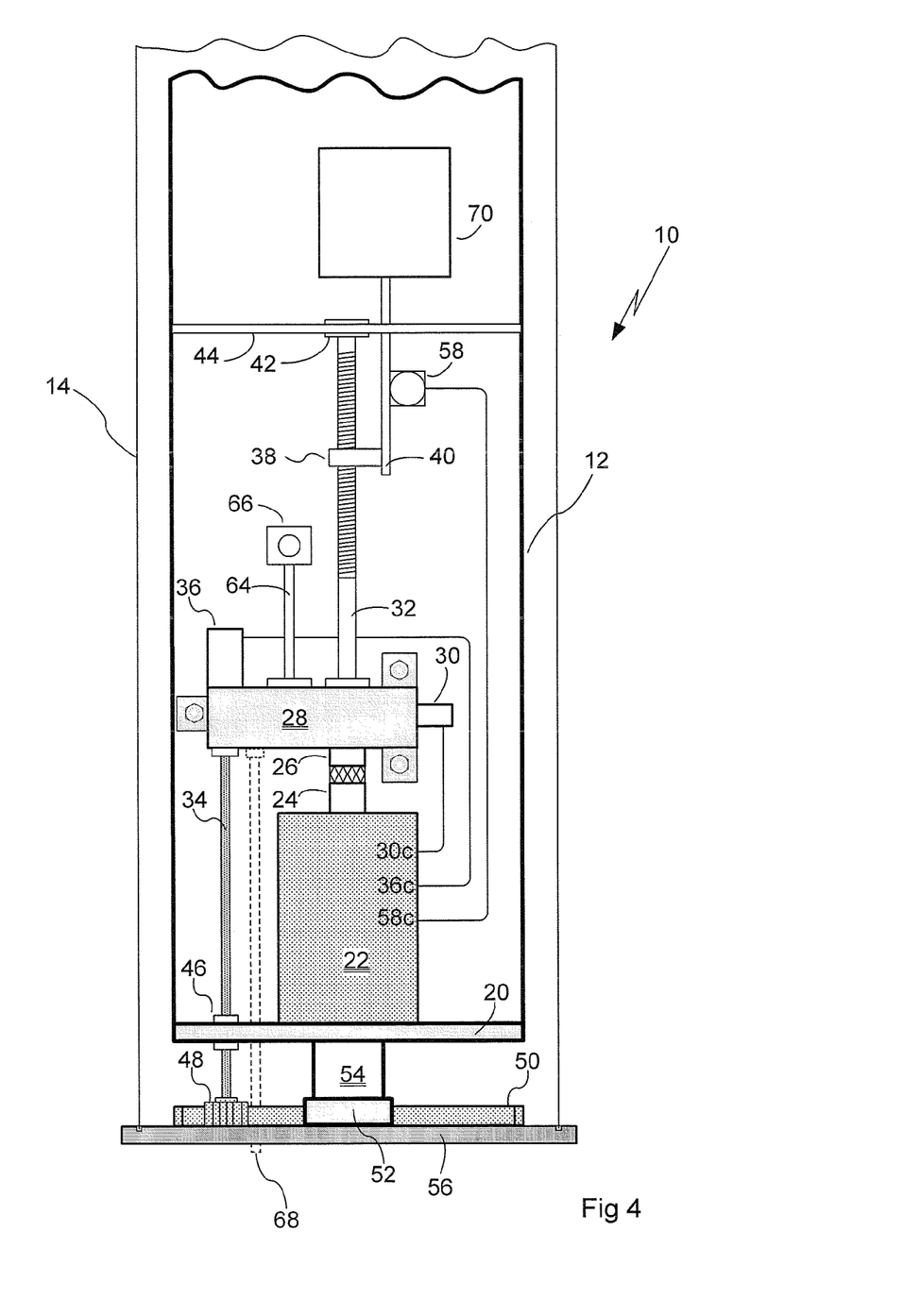
FIG. 4 is a block diagram for an antenna array employing a combined azimuth, beamwidth and elevation beam angle adjustment electromechanical system in accordance with a second preferred embodiment of the present invention (including optional manual transfer case function selector), as viewed from the back of the antenna.

FIG. 4 and FIG. 2B include provisions for manual operation. Fully manual operation can be readily accomplished by providing MCM motor 91 with a through shaft extension 24a which can be reachable through a service hole (not shown) in the bottom plate 56. Transfer case 28 may include manual selector control rod 68 extended to and reachable through a service hole (not shown) in the bottom plate 56, as well as addition of manual position indicators and the like. Manual operation may be desirable during commissioning when remote control capabilities are not fully functional.

MCM 22 will now be described with reference to FIG. 2B. MCM 22 includes electrical motor 91 which is controlled by a power supply module 93. Since it is desired to reverse direction of rotation and control initiation and the amount of rotation, microprocessor board 95 provides control inputs to motor power supply module 93. Motor power supply circuit may provide feedback to microprocessor board 95 to indicate excessive loads due to mechanical travel limit or mechanical binding. Microprocessor board 95 serves as a local area controller by monitoring AISG I/O and responding to AISG commands by controlling motor 91 rotation, if needed, while monitoring antenna element position (36c & 58c). Transfer case 28 output shaft control is accomplished by applying desired control signal 30C to shaft selector actuator 30.

In a second preferred embodiment shown in FIG. 4, transfer case 28 is equipped with three selectable output shafts (32, 34, 64). As described hereinabove RET shaft 32 and azimuth adjustment shafts 34 can be selected while the other is locked. Additionally an azimuth beamwidth adjustment is possible under a third operational control mode which actuates shaft 64 and coupler 66. Azimuth beamwidth adjustment is described in detail in provisional application Ser. No. 60/906,161 filed Mar. 8, 2007, and utility application Ser. No. 12/074,980 filed Mar. 7, 2008, the disclosure of which is incorporated herein by reference in its entirety, wherein radiating elements are moved about a center line of the reflector plate. Accordingly, MCM 22 can adapted to receive additional position sensor inputs (not shown) similar to RET 58c and azimuth position 36c, whilst transfer case output select actuator 30 can be adapted to have three selector positions and associated control modes.

The present invention has been described primarily in solving the aforementioned problems relating to use of employing combined azimuth and elevation beam angle adjustment systems. However, it should be expressly understood that the present invention may be applicable in other applications wherein employing combined azimuth and elevation beam angle adjustment control is required or desired. In this regard, the foregoing description of a single panel antenna array equipped with combined azimuth and elevation beam angle adjustment system is presented for purposes of illustration and description. Furthermore, the description is not intended to limit the invention to the form disclosed herein. Accordingly, variants and modifications consistent with the following teachings, and skill and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

REFERENCE DESIGNATORS

10 First preferred embodiment of the electro mechanical actuator system
12 Antenna Array Assembly
14 Antenna radome
16 Antenna reflector plate
18 Antenna radiating element (for example dipole, etc)
20 Antenna bottom end cap
21 Antenna top end cap
22 Motor control module (MCM)
24 MCM motor output shaft with a quick disconnect coupling
24a MCM motor output shaft assessable from outside for manual rotation
26 Transfer case input shaft
28 Transfer case module
30 Transfer case output select actuator
30c MCM control signal to transfer case actuator—selector
32 Output jack shaft for RET control
34 Output shaft for Azimuth adjustment 36 Azimuth shaft turn counter—position indicator
36c Signal output from azimuth shaft turn counter-position indicator
38 Jack screw coupling nut
40 RET phase shift linear actuator rod
42 Jack shaft support bearing
44 Bearing support bracket
46 Azimuth shaft support bearing
48 Azimuth cog gear
50 Azimuth ring gear
52 Bottom support bearing
54 Bottom support bracket
56 Stationary bottom plate
58 Displacement detector (RET)
58c Signal from displacement detector (RET)—position indicator
60 Backbone brace (used to provide antenna system rigidity)
62 Top pivot support
64 Azimuth beam width adjustment drive shaft
66 Azimuth beam width adjustment coupler to shaft
68 Optional manual transfer case override selector rod.
70 Mechanical phase adjuster
91 Electrical motor
93 Electrical motor power supply circuit
95 Microprocessor Board

What is claimed is:

1. A mechanically variable azimuth and beam tilt antenna, comprising:
a reflector;
a plurality of radiators coupled to the reflector;
a first mechanical drive element coupled to the reflector;
a mechanically controlled phase shifter;
a second mechanical drive element coupled to the phase shifter; and
a single mechanical actuator selectively coupled to the first and second mechanical drive elements,
wherein signal azimuth direction is variable based on positioning of the reflector by said actuator in a first control mode and wherein elevation beam tilt is controlled by adjusting said phase shifter by said actuator in a second control mode.

2. An antenna as set out in claim 1, wherein said actuator is coupled to said first and second mechanical drive elements by a transfer module, and wherein said transfer module receives a control signal to selectively couple said actuator to said first and second mechanical drive elements.

3. An antenna as set out in claim 2, wherein said actuator comprises a motor and said first and second mechanical drive elements comprise first and second rotatable shafts.

4. An antenna as set out in claim 3, wherein said second rotatable shaft is coupled to said phase shifter by a linear actuator and a coupling for creating linear motion from rotation of said second shaft.

5. An antenna as set out in claim 3, further comprising a fixed azimuth ring gear extending through an azimuth arcuate range and wherein said first rotatable shaft is coupled to said azimuth ring gear by an azimuth cog gear.

6. An antenna as set out in claim 5, further comprising an azimuth position indicator coupled to said first rotatable shaft.

7. An antenna as set out in claim 6, further comprising a motor control module and a feedback coupling from said azimuth position indicator to said motor control module.

8. An antenna as set out in claim 4, further comprising a phase shifter position indicator coupled to said linear actuator.

9. An antenna as set out in claim 8, further comprising a motor control module and a feedback coupling from said phase shifter position indicator to said motor control module.

10. An antenna as set out in claim 1, further comprising a radome, wherein said reflector is configured inside said radome and rotates within said radome.

11. A mechanically variable azimuth, beamwidth and beam tilt antenna, comprising:
an antenna array comprising a reflector and a plurality of radiators coupled to the reflector;
a first mechanical drive element coupled to the reflector;
a mechanically controlled phase shifter;
a second mechanical drive element coupled to the phase shifter;
a third mechanical drive element coupled to the antenna array; and
a single mechanical actuator selectively coupled to the first, second and third mechanical drive elements,
wherein signal azimuth direction is variable based on positioning of the reflector by said actuator in a first control mode, wherein elevation beam tilt is controlled by adjusting said phase shifter by said actuator in a second control mode and wherein beamwidth is controlled by adjusting relative radiator positioning in a third control mode.

12. An antenna as set out in claim 11, wherein said radiators are movable relative to said reflector in response to said second actuator motion to alter beamwidth.

13. An antenna as set out in claim 11, wherein said single actuator comprises a motor and said first, second and third mechanical drive elements comprise rotatable shafts.

14. An antenna as set out in claim 13, further comprising a transfer module selectively coupling said motor and said rotatable shafts.

15. An antenna electromechanical system, comprising:
a motor control module including a single motor and a motor control processor;
a selective transfer coupling mechanism coupled to said motor;
a first rotatable drive element coupled to said motor via said selective transfer coupling mechanism and to an antenna reflector coupling;
a second rotatable drive element coupled to said motor via said selective transfer coupling mechanism and to a mechanical phase shifter coupling;
wherein said selective coupling mechanism receives a control signal from said motor control processor to control selective coupling of the motor to said first and second rotatable drive elements.

16. An antenna electromechanical system as set out in claim 15, wherein said first and second rotatable drive elements each comprise a rotatable shaft.

17. An antenna electromechanical system as set out in claim 15, further comprising first and second position detectors for sensing position of said first and second rotatable drive elements, respectively, and providing detected position signals to said motor control processor.

18. An antenna electromechanical system as set out in claim 15, wherein said motor control processor has an input for receiving remotely provided antenna azimuth and antenna beam tilt adjustment control signals.

19. A method of adjusting signal azimuth direction and beam tilt in a wireless antenna having a reflector, a plurality of radiators coupled to the reflector, and a mechanically adjustable phase shifter, comprising:
receiving a remotely provided antenna azimuth adjustment control signal;

operatively coupling a motor to a first drive element coupled to the reflector;

adjusting a reflector azimuth pointing direction using said first drive element driven by said motor to move the reflector;

receiving a remotely provided antenna beam tilt adjustment control signal;

decoupling said motor from said first drive element and operatively coupling said motor to a second drive element coupled to the phase shifter; and adjusting the beam tilt using said second drive element driven by said motor to move the phase shifter.

20. The method of claim 19, further comprising:

receiving a remotely provided antenna beamwidth adjustment control signal;

operatively coupling the motor to a third drive element coupled to the radiators; and adjusting signal beamwidth using said third drive element driven by the motor to move the radiators.

* * * * *